United States Patent
Sato et al.

(10) Patent No.: US 6,922,875 B2
(45) Date of Patent: Aug. 2, 2005

(54) BUCKLE DEVICE

(75) Inventors: Akira Sato, Osaka (JP); Naoki Toyokawa, Osaka (JP)

(73) Assignee: Ashimori Industry Co., Ltd., Osaka (JP)

(*) Notice: Subject to any disclaimer, the term of this patent is extended or adjusted under 35 U.S.C. 154(b) by 0 days.

(21) Appl. No.: 10/479,465

(22) PCT Filed: Mar. 22, 2002

(86) PCT No.: PCT/JP02/02806

§ 371 (c)(1),
(2), (4) Date: Dec. 2, 2003

(87) PCT Pub. No.: WO02/100692

PCT Pub. Date: Dec. 19, 2002

(65) Prior Publication Data

US 2004/0154145 A1 Aug. 12, 2004

(30) Foreign Application Priority Data

Jun. 11, 2001 (JP) ........................... 2001-175538

(51) Int. Cl.$^7$ ............................................. A44B 11/26
(52) U.S. Cl. ..................................... 24/579.11; 24/632
(58) Field of Search ................. 24/579.11, 630–632; 297/483, 484; 280/808

(56) References Cited

U.S. PATENT DOCUMENTS

| | | | | |
|---|---|---|---|---|
| 5,023,981 A | * | 6/1991 | Anthony et al. | 24/579.11 |
| 5,038,446 A | * | 8/1991 | Anthony et al. | 24/579.11 |
| 5,142,748 A | * | 9/1992 | Anthony et al. | 24/579.11 |
| 5,182,837 A | * | 2/1993 | Anthony et al. | 24/642 |
| 5,283,933 A | * | 2/1994 | Wiseman et al. | 24/642 |
| 5,584,107 A | * | 12/1996 | Koyanagi et al. | 24/632 |
| 5,606,783 A | * | 3/1997 | Gillis et al. | 24/632 |
| 5,813,097 A | * | 9/1998 | Woellert et al. | 24/631 |

FOREIGN PATENT DOCUMENTS

| | | |
|---|---|---|
| JP | 6-284916 | 10/1994 |
| JP | 8-70912 | 3/1996 |
| JP | 2001-322529 | 11/2001 |

* cited by examiner

*Primary Examiner*—James R. Brittain
(74) *Attorney, Agent, or Firm*—Oblon, Spivak, McClelland, Maier & Neustadt, P.C.

(57) ABSTRACT

A buckle apparatus includes an insertion control subassembly press-operating an ejector when a pair of tongue parts are simultaneously inserted into a buckle body for allowing insertion up to an engaging position between the respective tongue parts and an engaging member while regulating the press operation by posture tilting of the ejector when only one tongue part is inserted. The insertion control subassembly includes a frame member having a guide rail part reciprocatively slidingly guiding the ejector along the direction of the press operation while including a stopper part separably coming into contact with the ejector in posture tilting from an insertion allowing posture for regulating movement in the direction of the press operation on the guide rail part.

6 Claims, 16 Drawing Sheets

BUCKLE DEVICE

TECHNICAL FIELD

The present invention relates to an improvement of a buckle apparatus, used for a child seat or the like, having a system of substantially simultaneously inserting and mounting a pair of tongue members.

BACKGROUND ART

In recent years, a child seat mounted on a seat of an automobile is used in order to protect a juvenile in the automobile against injury or mitigate the injury at the time of a traffic accident or the like by the automobile.

As a seat belt apparatus employed for this type of child seat, an end of a crotch webbing is fixed to the front center of a seat portion of the child seat and a buckle body is mounted on the other end of this crotch webbing, for example. Further, tongue members are mounted on webbings attached to extend over the right and left shoulders and the right and left hips of a juvenile sitting on the seat portion of the child seat respectively. It is so structured that the pair of tongue members are inserted into the buckle body thereby disengageably engaging with each other.

This type of disengageable buckle apparatus includes the one disclosed in Japanese Patent Application Laying-Open Gazette No. 8-70912, which has been brought into a structure comprising a pair of tongue members, an engaging member rotatably arranged in a buckle body for disengageably engaging with the respective tongue members, an ejector urged by an extrusion spring for urging the respective tongue members in a dissociative direction and a regulation plate inhibiting rotation of the engaging member in the engaging direction with respect to the tongue members when only one tongue member is inserted into the buckle body.

And it has been so structured that the regulation plate is rotated by the tongue member to inhibit rotation of the engaging member in the engaging direction so that no locked state resulting from engagement of the tongue member is attained when inserting only one tongue member into the buckle body and so structured that the regulation plate does not rotate but the engaging member engages with both tongue members so that an excellent locked state is attained when simultaneously inserting the pair of tongue members, to be brought into a structure aiming at improvement of reliability of the locked states on the side of the tongue members and the side of the buckle body.

According to the buckle apparatus disclosed in the aforementioned conventional gazette, however, it is a system separately comprising the rotatably supported regulation plate, and there has been such a defect that the number of components such as the regulation plate and a plurality of springs for setting the initial position of the regulation plate increases to result in a high cost.

Further, there has been such a problem that a space for rotating the regulation plate is also required to cause size increase of the overall apparatus and complication of the structure, and it is also inferior in assembling workability.

DISCLOSURE OF THE INVENTION

An object of the present invention is to provide a buckle apparatus having a compact and simple structure by suppressing increase of the number of components.

In one mode of the buckle apparatus according to the present invention, a buckle apparatus wherein an ejector comprised in a buckle body is press-operated against urging force of an extrusion spring due to insertion of a pair of tongue members into the buckle body while an engaging member disengageably engaging with the tongue members due to arrival of the tongue members on an engaging position is comprised in the buckle body for urging the tongue members in a dissociative direction by the extrusion spring through the ejector due to release of the engagement of the tongue members and the engaging member is brought into such a structure that such insertion control means that the ejector is subjected to the press operation in an insertion allowing posture to allow insertion of the respective tongue members up to the engaging position when the pair of tongue members are substantially simultaneously subjected to the insertion while the press operation is regulated by posture tilting of the ejector to suppress insertion of the tongue members up to the engaging position when only one said tongue member is subjected to the insertion is provided in the buckle body.

According to this mode, insertion of the tongue members is restricted by posture tilting of the ejector, whereby a buckle apparatus having a compact and simple structure can be advantageously provided while suppressing increase of the number of components.

In another mode of the buckle apparatus according to the present invention, the insertion control means consists of a frame member having a guide rail part slidingly guiding the ejector in the said insertion allowing posture to be reciprocative along the direction of the press operation and a stopper part separably coming into contact with the ejector in the posture tilting from the insertion allowing posture for regulating movement in the direction of the press operation, and the said stopper part is brought into a structure provided on the guide rail part.

According to this mode, there is such an advantage that insertion control of the tongue members can be more effectively performed without increasing the number of components.

In still another mode of the buckle apparatus according to the present invention, a tongue contact part of the ejector coming into contact with the both tongue members in the press operation is brought into a structure formed in a sharp shape toward the dissociative direction.

According to this mode, there is such an advantage that the ejector readily posture-tilts when only one tongue member is inserted to be capable of improving suppression performance for not unpreparedly inserting the tongue member to the engaging position with the engaging member.

In a further mode of the buckle apparatus according to the present invention, insertion side end surfaces of the pair of tongue members coming into contact with the ejector for performing the press operation are brought into structures mutually inwardly inclinatorily formed.

According to this mode, there is such an advantage that the ejector can be stably held on central positions of both tongue members and the ejector can be stably press-operated in the insertion allowing posture along the insertion direction thereof to be more reliably engaged with the engaging member when substantially simultaneously inserting both tongue members.

In a further mode of the buckle apparatus according to the present invention, a posture holding guide separably coming into contact with the ejector urged by the extrusion spring for holding the ejector in the insertion allowing posture in an insertion standby state for the tongue members is brought into a structure provided on the frame member.

According to this mode, there is such an advantage that the ejector can be made to stably stand by in the insertion allowing posture and control operation in insertion of the tongue members can be stably exerted.

BEST MODE FOR CARRYING OUT THE INVENTION

Figure 1:
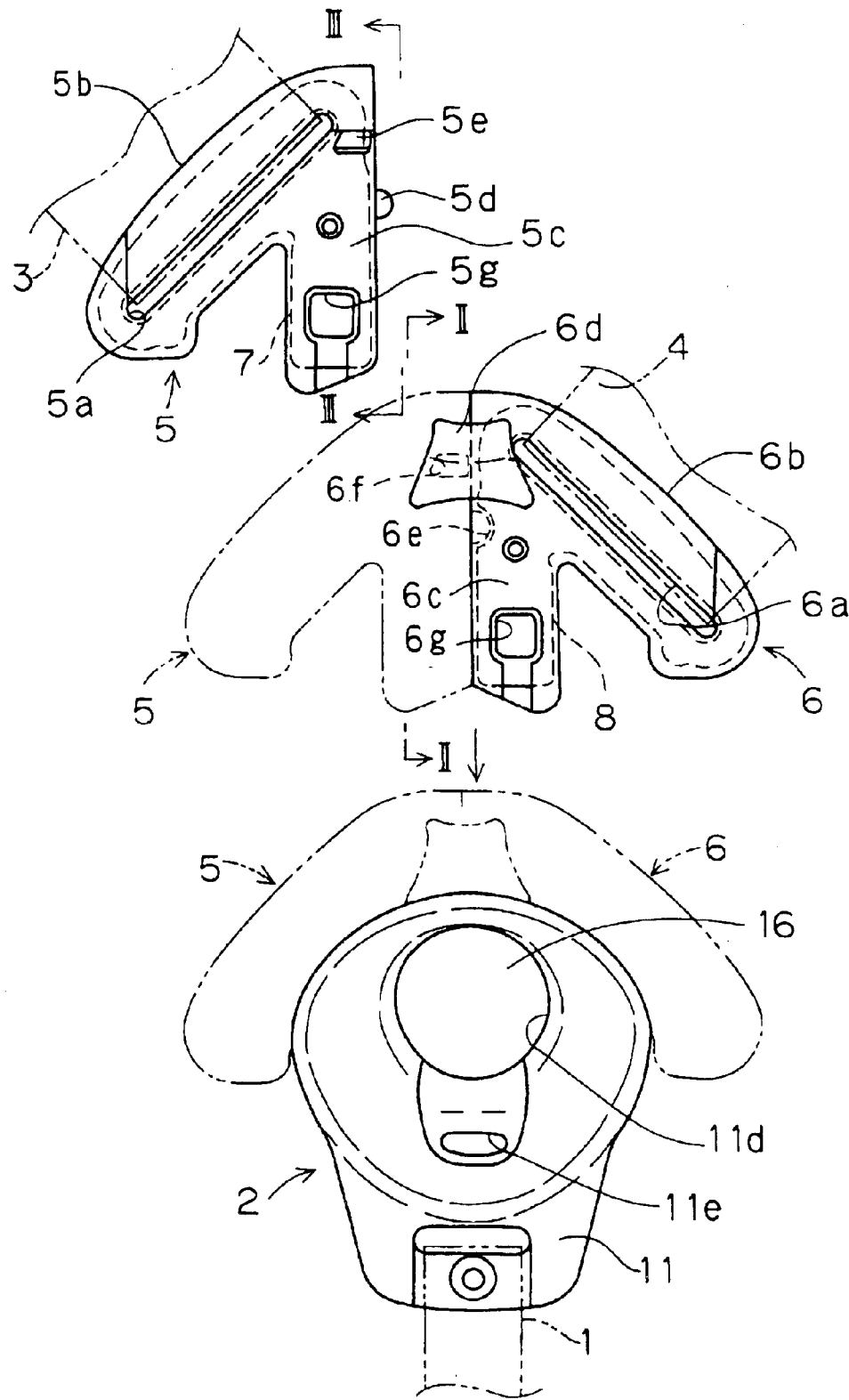
FIG. 1 is an operational explanatory diagram in an embodiment of the present invention.
Figure 2:
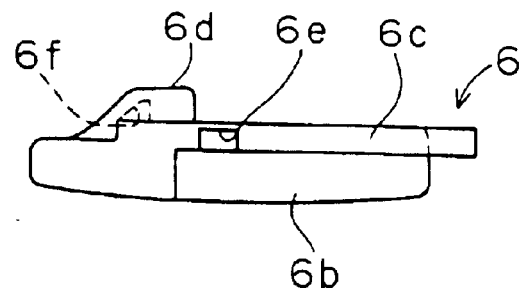
FIG. 2 is a view taken along the line II—II in FIG. 1.
Figure 3:
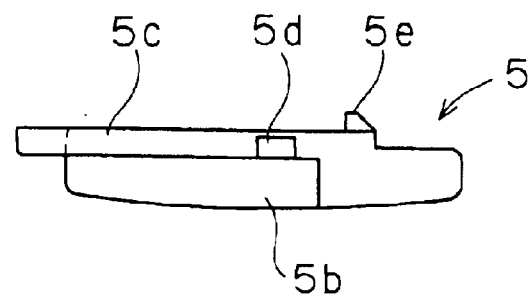
FIG. 3 is a view taken along the line III—III in FIG. 1.
Figure 4:
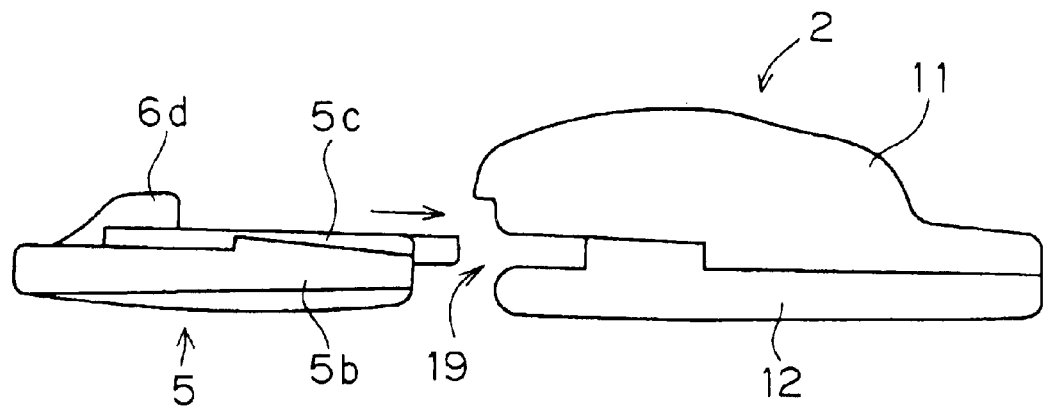
FIG. 4 is an operational explanatory diagram for insertion of a tongue member.

Describing an embodiment of the buckle apparatus according to the present invention with reference to the drawings, it is structured by a buckle body 2 mounted on an end of a crotch webbing 1 fixed to a seat portion of a child seat and a pair of tongue members 5 and 6 mounted on webbings 3 and 4 attached to extend over the right and left shoulders and the right and left hips of a juvenile sitting on the seat portion of the child seat respectively, and so structured that mutually disengageably engaging locked states are obtained by inserting these tongue members 5 and 6 into the buckle body 2, as shown in FIG. 1 to FIG. 4.

The respective tongue members 5 and 6 are formed by molding metal plates 7 and 8 formed in proper shapes with resin and comprise webbing mounting parts 5b and 6b having webbing insertion holes 5a and 6a on/to which the webbings 3 and 4 are insertionally mounted/fixed respectively on single sides, while tongue parts 5c and 6c substantially in the form of flat plates inserted into the buckle body 2 are comprised on second sides respectively.

Locating projections 5d and 5e are formed on one side surface and the upper surface of one tongue part 5c respectively, in order to mutually arrange the respective tongue parts 5c and 6c side-by-side to be simultaneously insertable into the buckle body 2. Engaging concavities 6e and 6f in which the locating projections 5d and 5e are disengageably engaged respectively are formed on one side surface of the opposite tongue part 6c and a side of the upper surface closer to the lower surface of an extension part 6d respectively.

Rectangular engaging holes 5g and 6g in which an engaging member 10 shown in FIG. 5 to FIG. 9 and FIG. 19 to FIG. 21 is engageably engaged are formed on the respective tongue parts 5c and 6c respectively. At this time, the metal plates 7 and 8 on the peripheral edge portions of the respective engaging holes 5g and 6g and portions from the respective engaging holes 5g and 6g to forward ends of the tongue members 5 and 6 along the insertion direction are exposedly structured.

The buckle body 2 comprises an upper cover body 11 and a lower cover body 12 brought into shapes vertically divided into two, so that the engaging members 10 disengageably engaged with the inserted tongue parts 5c and 6c, an ejector 13 ejecting the tongue parts 5c and 6c, an extrusion spring 14 urging the ejector 13 in an extrusive direction, i.e., a dissociative direction P, a frame member 15 supporting the engaging member 10, the ejector 13, the extrusion spring 14 etc., a disengagement button 16 releasing the engagement of the tongue parts 5c and 6c and the engaging member 10 and a display member 17 displaying the engaging state of the tongue parts 5c and 6c and the engaging member 10 are storedly attached between both cover bodies 11 and 12.

Figure 10:
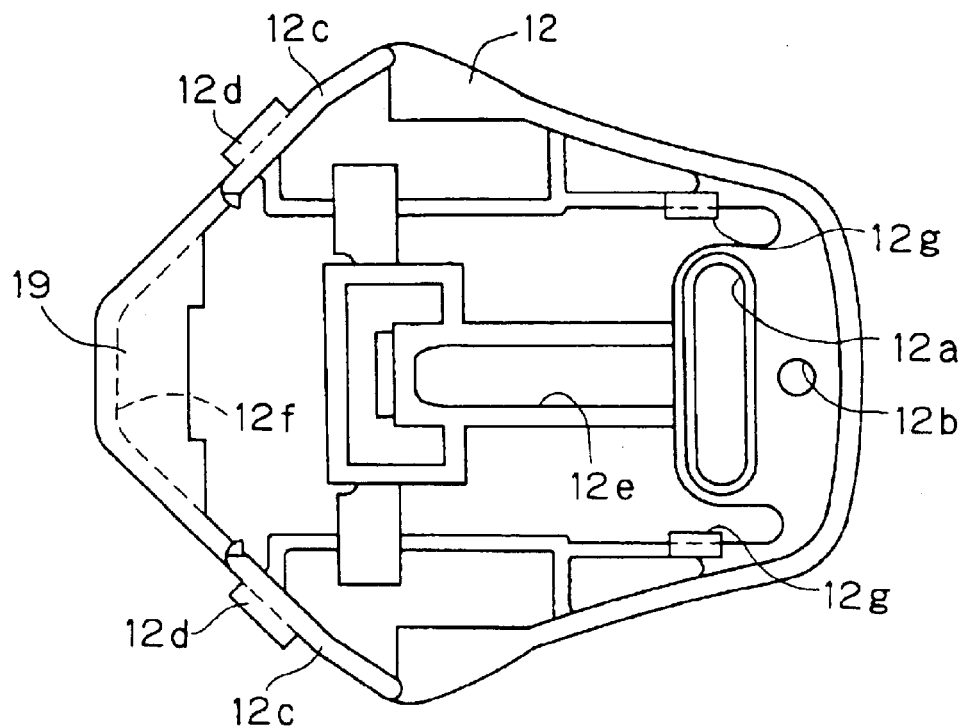
FIG. 10 is a plan view of a lower cover body.

The lower cover body 12 is molded out of resin or the like, and a webbing insertion hole 12a on/to which the crotch webbing 1 is insertionally mounted/fixed is formed and a screw insertion hole 12b for fixing the upper cover body 11 and the frame member 15 to each other is formed on an end of the lower cover body 12, as also shown in FIG. 10. The other end of the lower cover body 12 is rendered a tongue insertion part 19 into which the tongue parts 5c and 6c are inserted, while engaging walls 12c are uprightly provided on both side edge portions of the lower cover body 12 located on both sides of the tongue insertion part 19 and stop parts 12d projecting outward are projectingly provided on upper edge portions of the respective engaging walls 12c respectively.

Further, an elongated ejector guide groove 12e having a proper width is formed on the bottom surface of the lower cover body 12 from the central portion in the direction of the webbing insertion hole 12a and a stop concavity 12f on which a stop fragment part 15a projectingly formed on the frame member 15 is stopped is formed on the side of the tongue insertion part 19 while stop parts 12g disengageably engaged with the upper surfaces of both side edge portions of the frame member 15 are formed on both sides of the webbing insertion hole 12a respectively.

Figure 11:
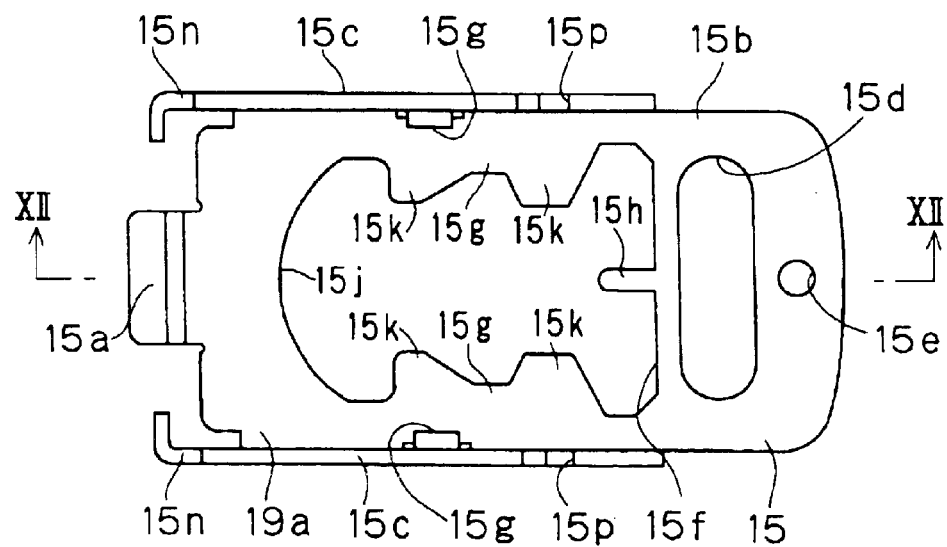
FIG. 11 is a plan view of a frame member.
Figure 12:
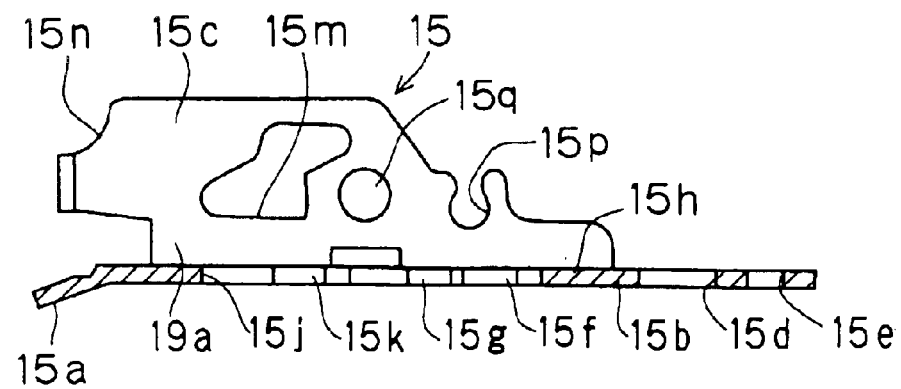
FIG. 12 is a sectional view taken along the line XII—XII in FIG. 11.

The frame member 15 consists of a properly bent/formed metal plate, and is brought into a structure comprising a substantially rectangular substrate part 15b, the said stop fragment part 15a projectingly formed on a longitudinal end of the substrate part 15b and support wall parts 15c oppositely uprightly provided from both side edge portions of the substrate part 15b respectively, as also shown in FIG. 11 and FIG. 12. The portion between these support wall parts 15c is structured as a tongue insertion path 19a for both tongue parts 5c and 6c inserted from the tongue insertion part 19.

Further, the substrate part 15b is formed with a webbing insertion hole 15d and a screw insertion hole 15e rendered communicative with the webbing insertion hole 12a and the screw insertion hole 12b of the lower cover body 12, while a guide hole 15f guiding the ejector 13 along the longitudinal direction is formed on the central portion.

Figure 13:
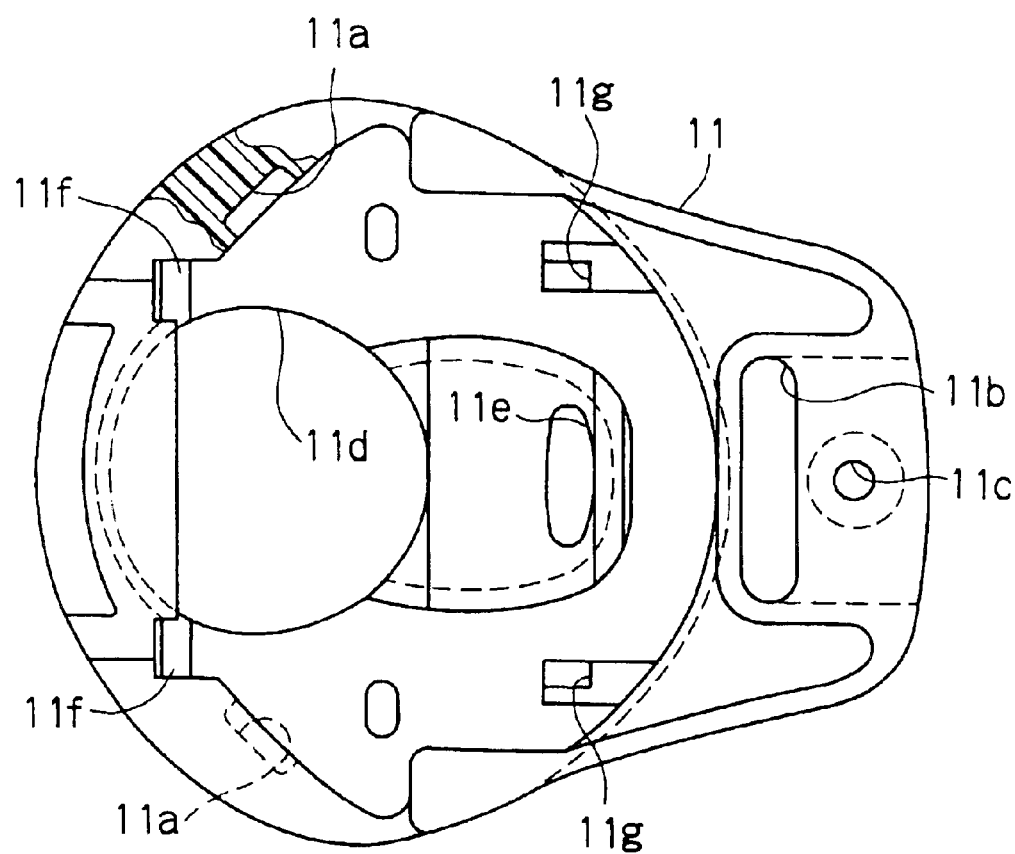
FIG. 13 is a bottom plan view of the upper cover body.
Figure 14:
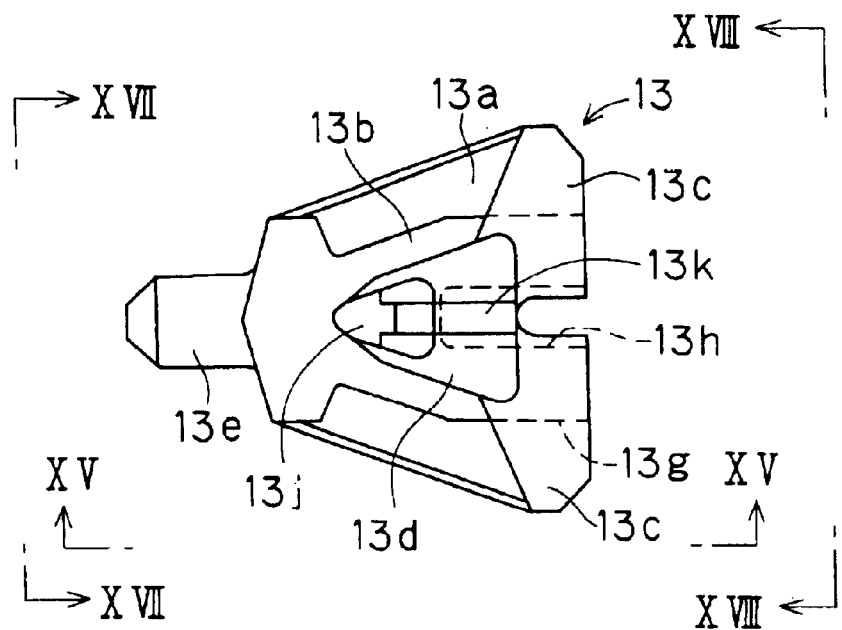
FIG. 14 is a plan view of an ejector.
Figure 15:
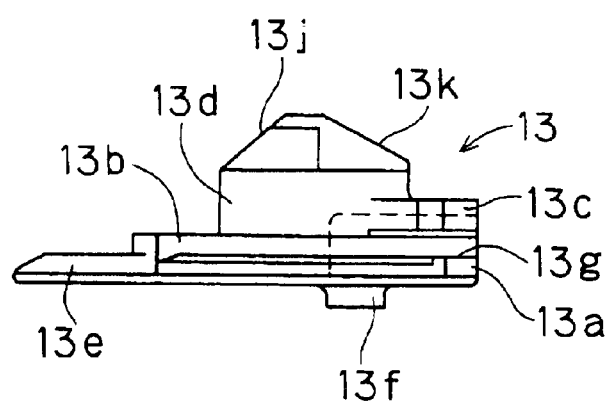
FIG. 15 is a view taken along the line XV—XV in FIG. 14.

The upper cover body 11 is molded out of resin or the like in order to cover the upper surface side of the lower cover body 12, formed with stop cavities 11a in which the respective stop parts 12d of the lower cover body 12 are disengageably stopped, and formed with a webbing insertion hole 11b and a screw insertion hole 11c rendered communicative with the webbing insertion hole 12a and the screw insertion hole 12b of the lower cover body 12, as also shown in FIG. 13.

The side of the upper cover body 11 closer to the tongue insertion part 19 is formed with an operational opening 11d of a corresponding shape in which the cancel button 16 is rendered exposed and formed with a display window 11e located between the operational opening 11d and the webbing insertion hole 11b so that the display member 17 can be visually recognized.

The ejector 13 is formed into a substantially triangular shape in plan view by resin or the like as also shown in FIG. 14 to FIG. 18, and comprises a slide base part 13a arranged under the substrate part 15b of the frame member 15, a slide guide part 13b located in the guide hole 15f on the upper surface side of the slide base part 13a while having a height substantially identical to the thickness of the substrate part 15b, a slide vane part 13c extensionally formed on the upper surface side of the slide guide part 13b from an end opposite to the tongue insertion part 19 on an upper area of the slide base part 13a on the upper side of the substrate part 15b and a tongue contact part 13d projectingly formed upwardly beyond the upper surface of the slide guide part 13b on the central portion of the ejector 13.

Here, rail groove parts 13g in which both guide rail parts 15g structured by both side edge portions of the guide hole 15f in the frame member 15 shown in FIG. 5, FIG. 7, FIG. 9 and FIG. 11 are slidably engaged respectively are structured between the upper and lower slide vane part 13c and slide base part 13a.

Figure 16:
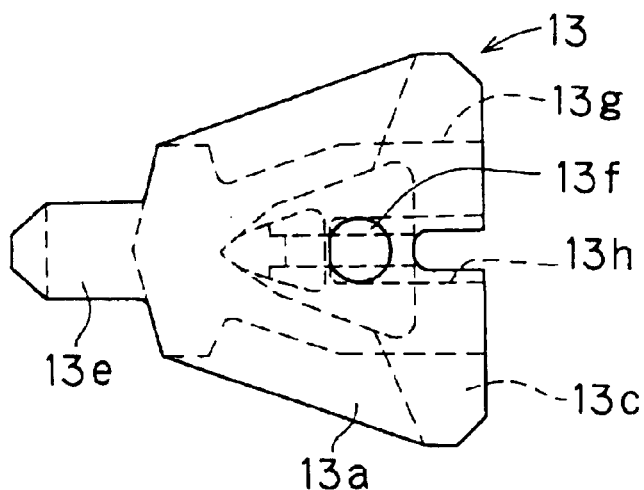
FIG. 16 is a bottom plan view of the ejector.
Figure 17:
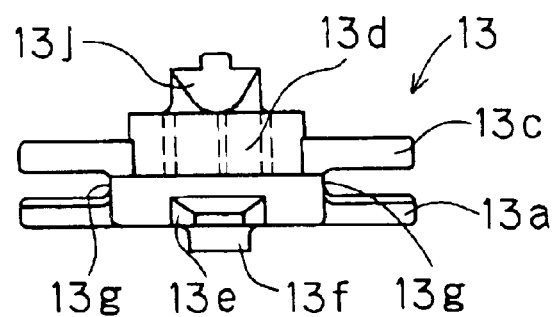
FIG. 17 is a view taken along the line XVII—XVII in FIG. 14.
Figure 18:
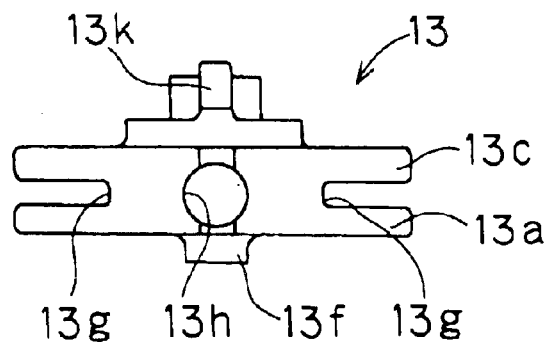
FIG. 18 is a view taken along the line XVIII—XVIII in FIG. 14.

An end of the slide base part 13a projecting beyond the slide guide part 13b in the direction of the tongue insertion part 19 is rendered a narrow lingual part 13e, and a boss part 13f engaged in the ejector guide groove 12e and slidable along the longitudinal direction thereof is comprised on the lower surface side of the central portion of the slide base part 13a. At this time, the boss part 13f is substantially cylindrically formed and its end surface closer to the tongue insertion part 19 is formed in a flat surface as shown in FIG. 16, to separably come into contact with a flat surface on the side of the ejector guide groove 12e shown in FIG. 10 closer to the tongue insertion part 19.

Further, the tongue contact part 13d is formed in a sharp triangular shape toward the dissociative direction P as shown in FIG. 5, FIG. 7, FIG. 9 and FIG. 14, and so structured that its sharp forward end portion is located on the centers of both tongue parts 5c and 6c inserted from the tongue insertion part 19. At this time, insertion side end surfaces 5h and 6h of both tongue parts 5c and 6c are mutually inwardly inclinatorily formed, and so structured that the said insertion side end surfaces 5h and 6h separably come into contact with both side surfaces of the tongue contact part 13d brought into the triangular shape.

A spring bearing hole 13h in the form of a circular hole is formed on an end surface of the ejector 13 opposite to the lingual part 13e as shown in FIG. 14 to FIG. 16 and FIG. 18 and the extrusion spring 14 consisting of a coil spring is compressively mounted between the same and a spring support projection 15h comprised on the frame member 15 as shown in FIG. 5 to FIG. 9, so that the ejector 13 is elastically urged in the direction of the tongue insertion part 19, i.e., in the dissociative direction P due to the urging force of this extrusion spring 14.

Figure 5:
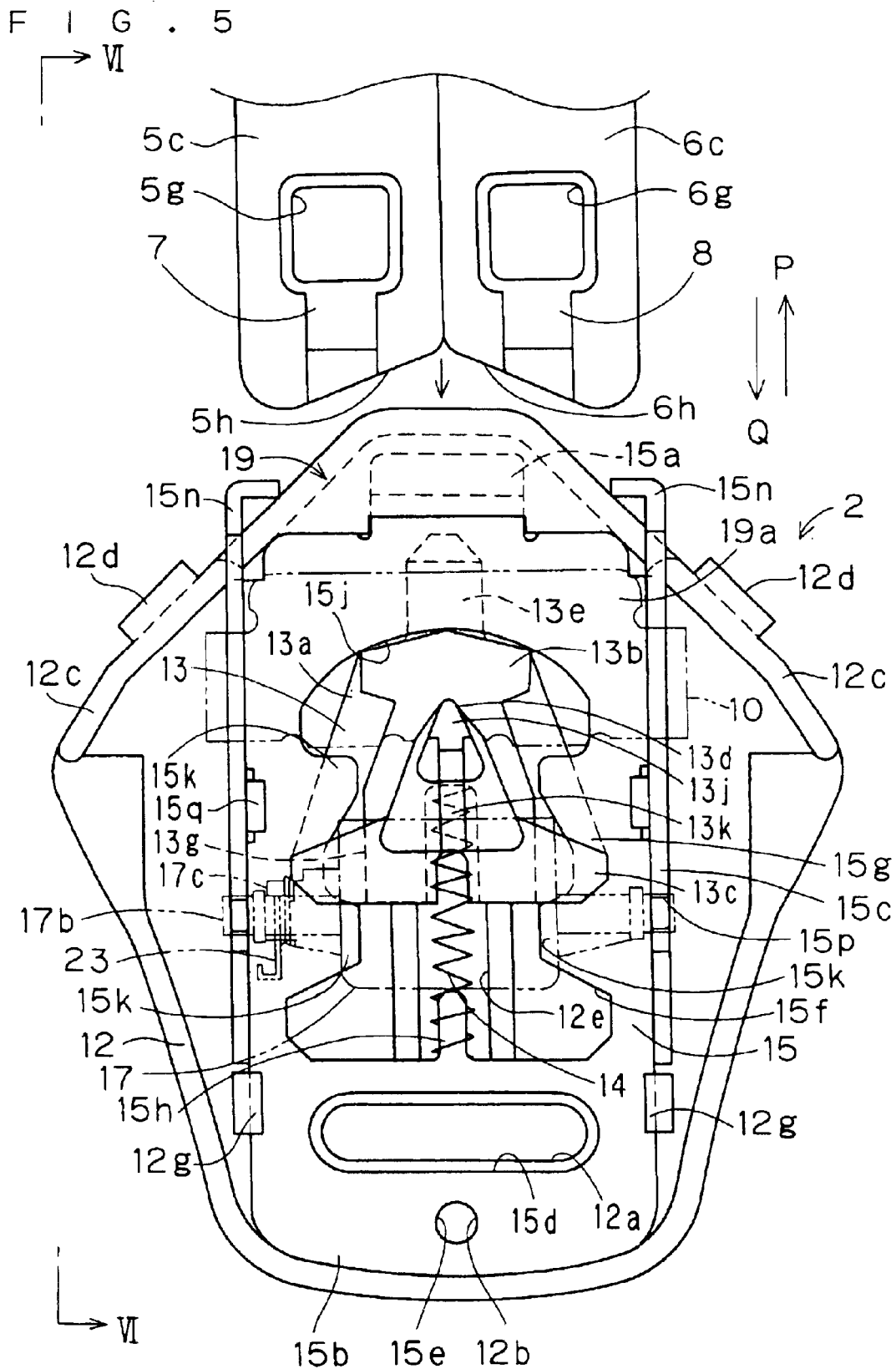
FIG. 5 is an operational explanatory diagram for insertion of tongue parts in a state detaching an upper cover body.

At this time, an edge portion of the guide hole 15f closer to the tongue insertion part 19 is formed in an arcuate shape swelling out in the direction of the tongue insertion part 19 on the width-directional central portion and structured as a posture holding guide 15j guiding the forward end portion of the slide guide part 13b to the width-directional center in an insertion standby state where the respective tongue parts 5c and 6c are uninserted into the ejector 13 urged by the extrusion spring 14, as shown in FIG. 5 and FIG. 11. The forward end portion of the slide guide part 13b slidably coming into contact with the posture holding guide 15j is structured in a proper polygonal shape projecting on the width-directional central portion or an arcuate shape corresponding to the posture holding guide 15j. In this case, it is also brought into contact with the flat surface of the ejector guide groove 12e closer to the tongue insertion part 19 and the flat surface on the boss part 13f of the ejector 13.

When both tongue parts 5c and 6c are substantially simultaneously inserted from the tongue insertion part 19 in this insertion standby state, the ejector 13 is structured to be press-operated along the insertion direction Q of both tongue parts 5c and 6c in the state of the posture. Here, the ejector 13 is structured to stably stand by in an insertion allowing posture in the insertion standby state.

On the upper surface side of the tongue contact part 13d, an upwardly tilting engaging member holding guide 13j and a downwardly tilting display member holding guide 13k are comprised respectively along the insertion direction Q of both tongue parts 5c and 6c.

Further, stopper parts 15k separably coming into contact with the slide guide part 13b due to posture tilting around the boss part 13f from the insertion allowing posture of the ejector 13 for regulating movement in the direction of the press operation, i.e., in the insertion direction Q are extensionally formed on both guide rail parts 15g respectively. At this time, the stopper parts 15k are extended substantially in the form of trapezoids and comprised in a pair separably in the insertion direction Q for the respective tongue parts 5c and 6c.

Both side portions of the slide guide part 13b closer to the tongue insertion part 19 are formed in the shape of narrow constrictions, in order to allow the posture tilting of the ejector 13.

Figure 19:
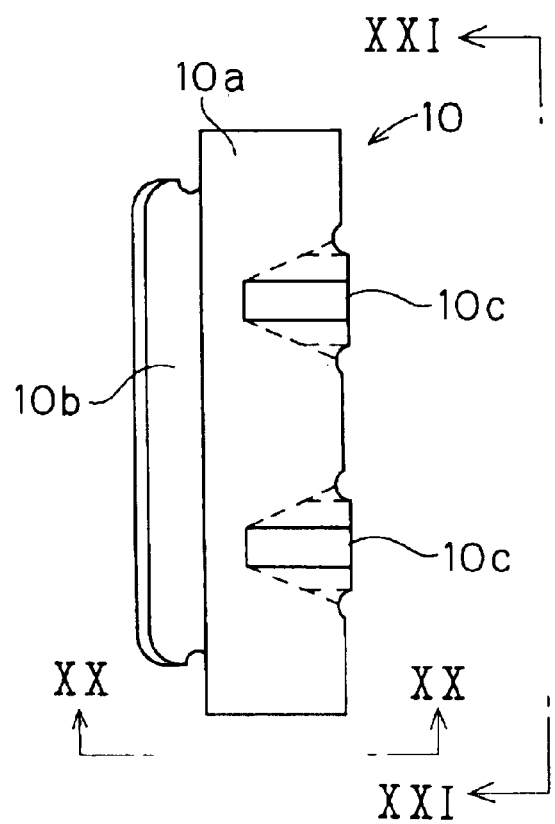
FIG. 19 is a plan view of an engaging member.
Figure 20:
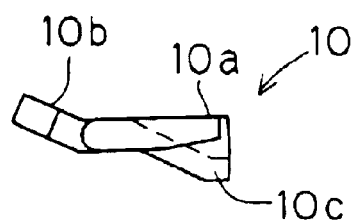
FIG. 20 is a view taken along the line XX—XX in FIG. 19.
Figure 21:
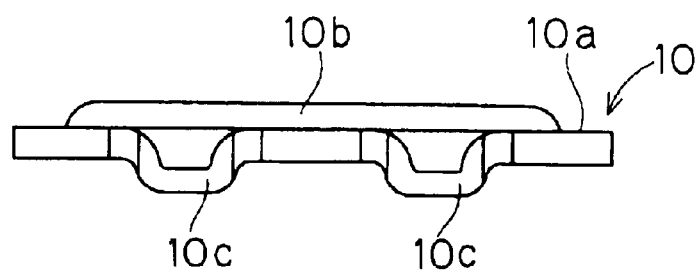
FIG. 21 is a view taken along the line XXI—XXI in FIG. 19.
Figure 22:
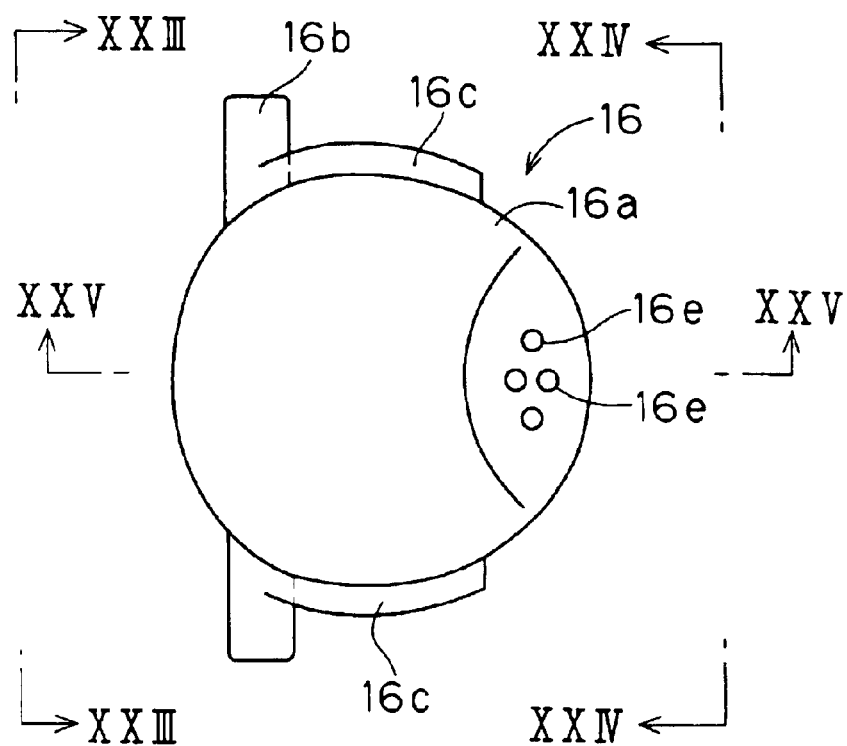
FIG. 22 is a plan view of a disengagement button.
Figure 23:
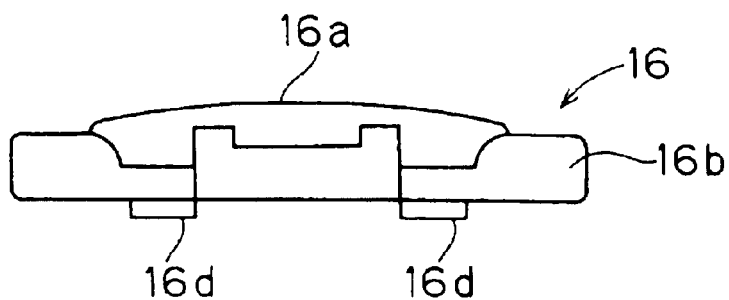
FIG. 23 is a view taken along the line XXIII—XXIII in FIG. 22.
Figure 24:
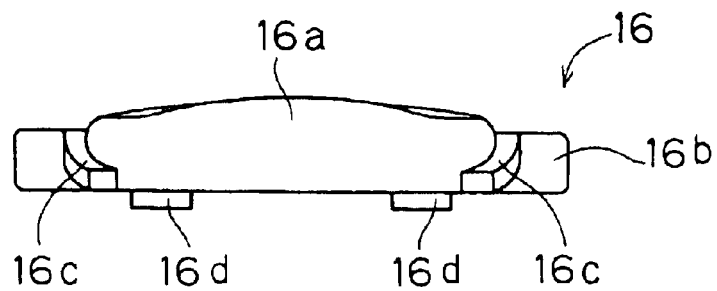
FIG. 24 is a view taken along the line XXIV—XXIV in FIG. 22.

As also shown in FIG. 19 to FIG. 21, the engaging member 10 is prepared by bending/forming a metal plate into a proper shape by press working or the like, and structured by a rectangular flat support fragment part 10a swingably supported between holding holes 15m formed on both support wall parts 15c of the frame member 15 respectively, a disengagement operational fragment part 10b upwardly inclinatorily extensionally provided from an edge of the support fragment part 10a closer to the tongue insertion part 19 and engaging projections 10c downwardly projectingly formed on the support fragment part 10a respectively in correspondence to the positions of the engaging holes 5g and 6g of the respective tongue parts 5c and 6c inserted along the tongue insertion path 19a and disengageably engaged in the respective engaging holes 5g and 6g.

As shown in FIG. 22 to FIG. 25, the disengagement button 16 is molded out of resin or the like, and structured by a press operation part 16a substantially circular in plan view, spindle parts 16b comprised to extend on both side portions on a side of the press operation part 16a closer to the tongue insertion part 19, return regulation vanes 16c extensionally formed along both side portions of the outer side surface of the press operation part 16a respectively and operational projections 16d downwardly projectingly formed on both sides of intermediate parts of the respective tongue parts 5c and 6c along the insertion direction on the lower surface side of the press operation part 16a respectively. The upper surface of the press operation part 16a is properly formed with non-slip projections 16e serving as non-slips in the press operation.

Figure 6:
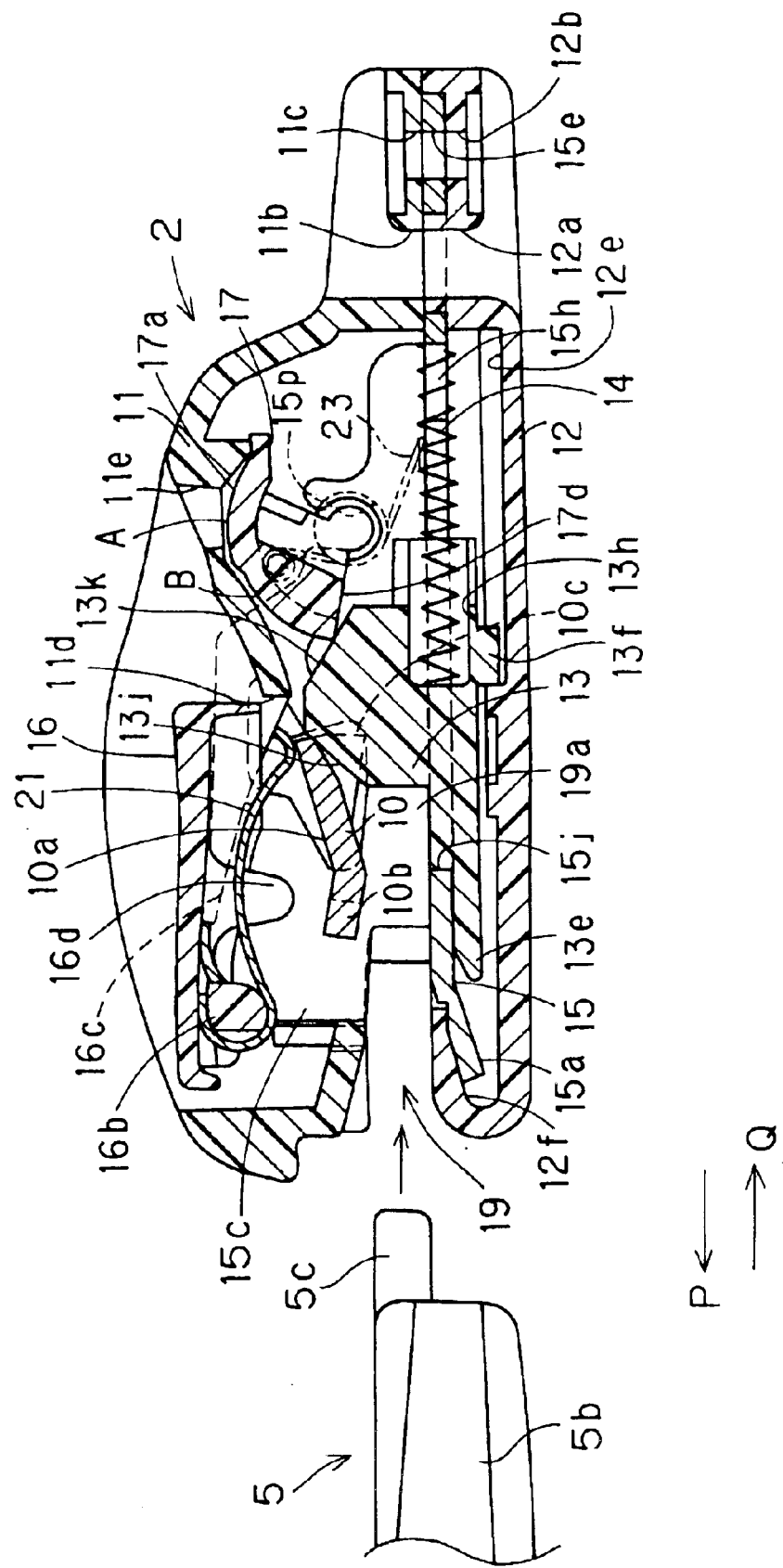
FIG. 6 is a partially fragmented sectional view taken along the line VI—VI in FIG. 5.
Figure 8:
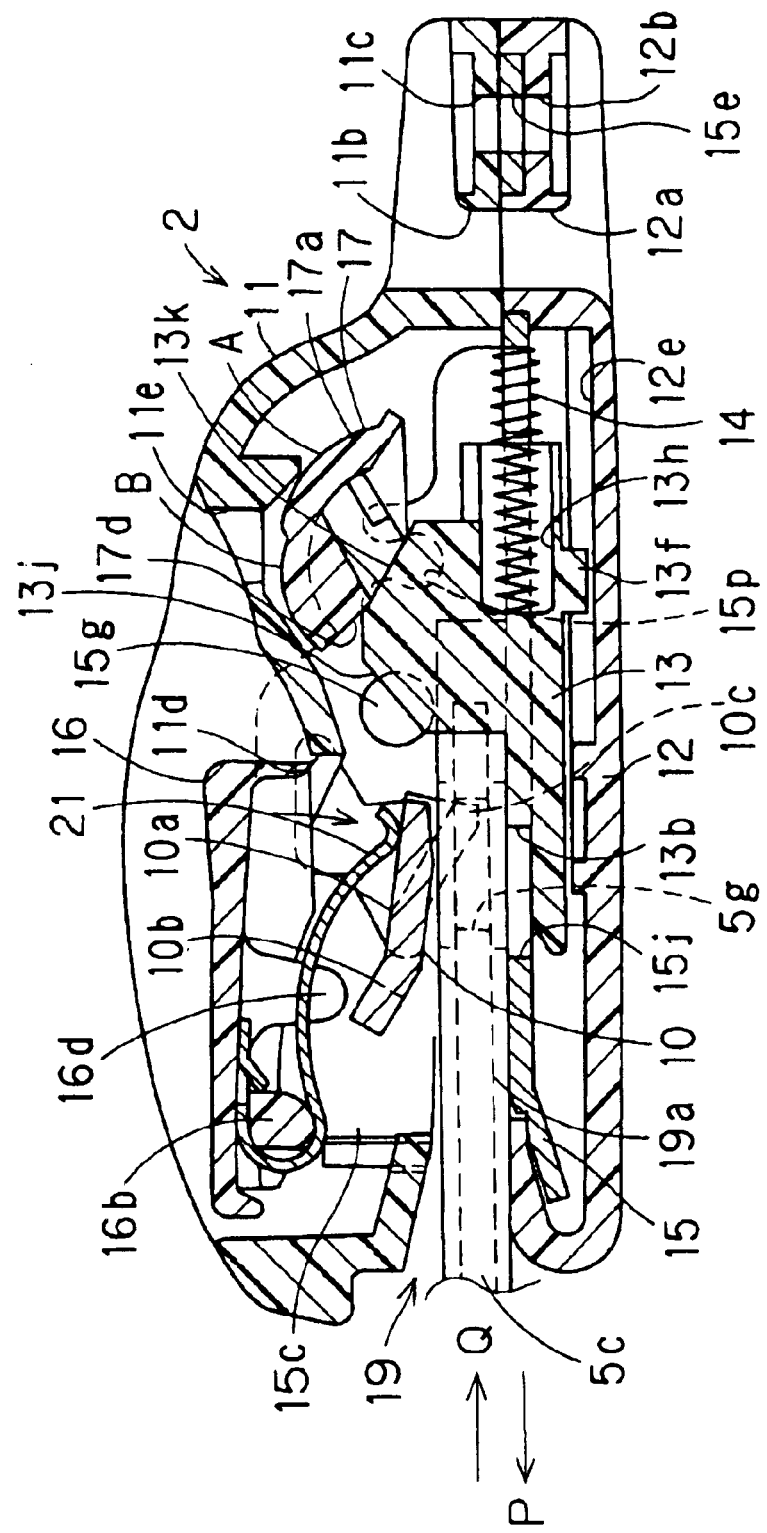
FIG. 8 is a partially fragmented sectional view taken along the line VIII—VIII in FIG. 7.
Figure 25:
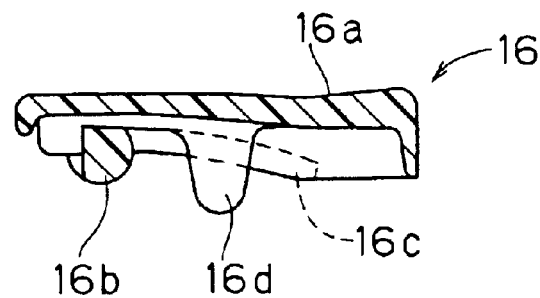
FIG. 25 is a sectional view taken along the line XXV—XXV in FIG. 22.
Figure 26:
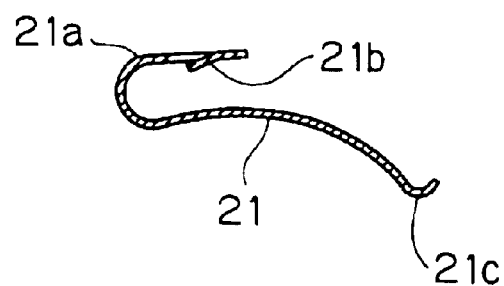
FIG. 26 is a sectional view of a plate spring.
Figure 27:
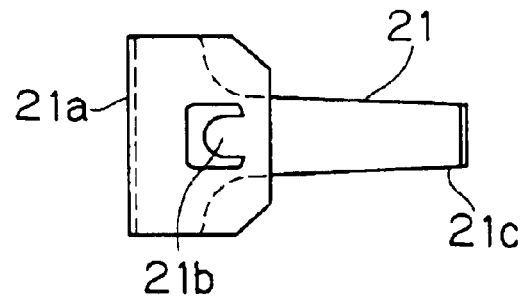
FIG. 27 is a plan view of the plate spring.

As shown in FIG. 25, the peripheral surfaces of the spindle parts 16b located on the lower surface side of the press operation part 16a are partially notchedly formed so that a fitting part 21a of a properly bent/formed plate spring 21 shown in FIG. 26 and FIG. 27 is fitted in the spindle parts 16b of these portions as shown in FIG. 6 and FIG. 8, so that a fitted and uprightly formed stop fragment 21b is prevented from displacement and stopped on the spindle parts 16b.

As shown in FIG. 6 and FIG. 8, the spindle parts 16b projecting on both sides of the disengagement button 16 are relatively rotatably supported by support concavities 15n comprised on ends of both support wall parts 15c of the frame member 15 closer to the tongue insertion part 19 respectively and support concavities 11f formed on the lower surface of the upper cover body 11 closer to the tongue insertion part 19 respectively. At this time, a push-down part 21c on a bent end of the plate spring 21 is elastically brought into contact with the upper surface of an end of the support fragment part 10a of the engaging member 10 opposite to the disengagement operational fragment part 10b and brought into a structure making elastic urging in order to push down the end of the support fragment part 10a downward.

Figure 28:
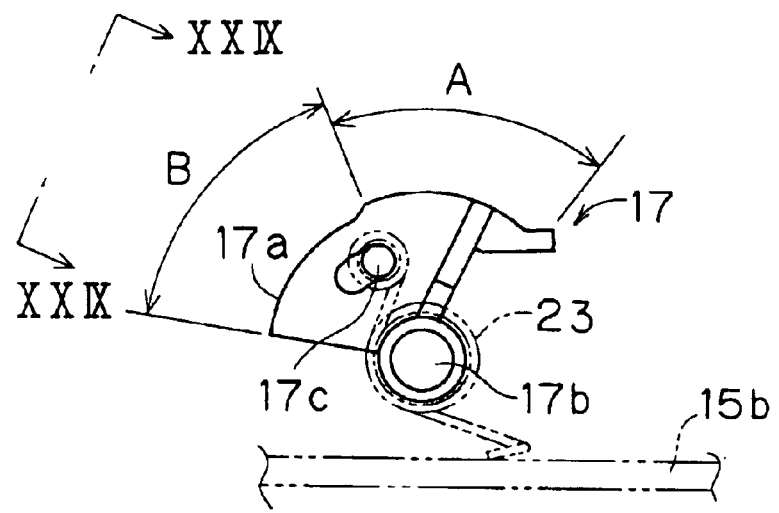
FIG. 28 is a side elevational view of a display member.
Figure 29:
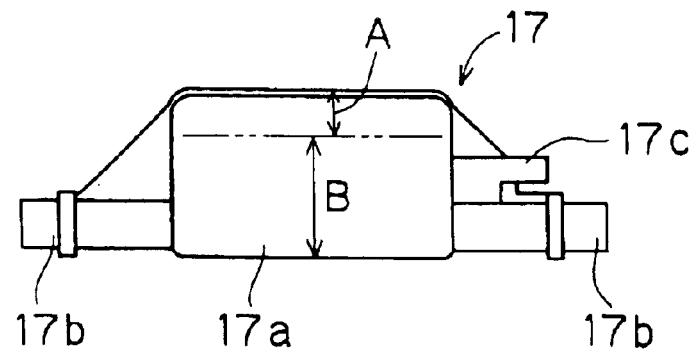
FIG. 29 is a view taken along the line XXIX—XXIX in FIG. 28.
Figure 30:
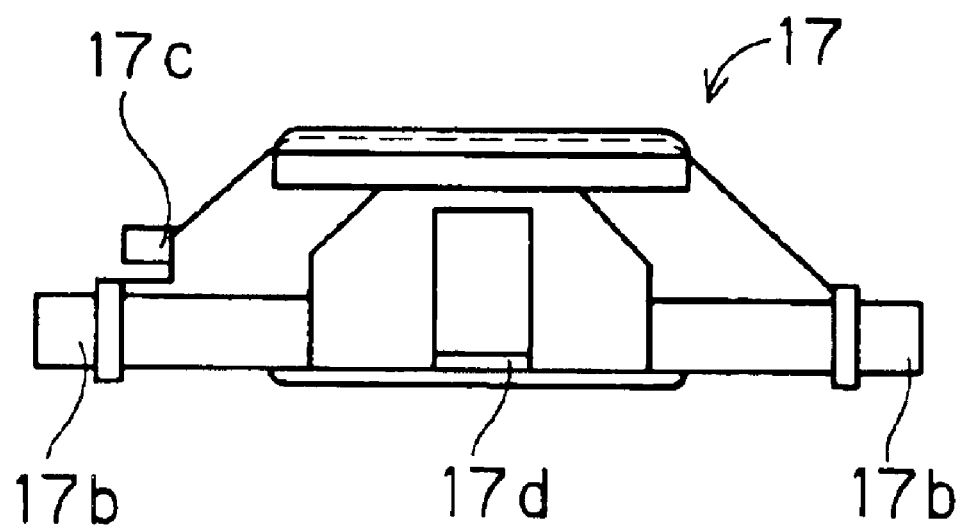
FIG. 30 is a rear elevational view of FIG. 29.

As shown in FIG. 28 to FIG. 30, the display member 17 is formed by resin or the like, and comprises an arcuate display part 17a, spindle parts 17b extensionally formed on both side portions in order to support the display part 17a and a spring bearing part 17c projectingly formed on one side surface. The display part 17a is divided into two, i.e., an unlocked state display area A colored red and a locked state display area B colored green along the peripheral direction.

As shown by phantom lines in FIG. 28, both spindle parts 17b are relatively rotatably supported in support concavities 15p formed on both support wall parts 15c respectively in order to bush-engage the central portion of a torsion spring 23 in one spindle part 17b, bush-stop one end to the spring bearing parts 17c and compressively bring the other end onto the substrate part 15b of the frame member 15, and separation of the spindle parts 17b from the respective support concavities 15p is regulated by holding concavities 11g comprised on the lower surface of the upper cover body 11.

This display member 17 is so structured that an edge located on the side of the display part 17a in the direction of the tongue insertion part 19 is brought into contact with the display member holding guide 13k due to the urging force of the torsion spring 23 and the unlocked state display area A is located in correspondence to the display window 11e in the insertion standby state of both tongue parts 5c and 6c, as shown in FIG. 6. Further, it is so structured that, in a locked state where both tongue parts 5c and 6c are inserted, the display member 17 is rotationally operated about the spindle parts 17b against the urging force of the torsion spring 23 due to relative sliding of a slide part 17d comprised on the display member 17 and the display member holding guide 13k and the locked state display area B is located in correspondence to the display window 11e, as shown in FIG. 8.

Mutually inwardly projecting guide boss parts 15q are projectingly provided on both support wall parts 15c of the frame member 15 as shown in FIG. 11 and FIG. 12, in order to regulate floating of insertion end sides when the respective tongue parts 5c and 6c are inserted along the tongue insertion path 19a.

This embodiment is structured in the aforementioned manner, and the ejector 13 is urged by the urging force of the extrusion spring 14 in the direction of the tongue insertion part 19 so that an end of the slide guide part 13b located in the direction of the tongue insertion part 19 comes into contact with the posture holding guide 15j of the frame member 15 while the flat surface of the boss part 13f is brought into contact with the flat surface of the ejector guide groove 12e and held in the insertion allowing posture press-movable along the insertion direction of both tongue parts 5c and 6c in a non-insertion state of the respective tongue parts 5c and 6c, as shown in FIG. 5 and FIG. 6.

The engaging member 10 is held in the engaging member holding guide 13j, the engaging projections 10c are retreated upward beyond the tongue insertion path 19a, the slide part 17d comes into contact with the display member holding guide 13k in the display member 17, and the unlocked state display area A is located in the display window 11e. At this time, the disengagement button 16 is upwardly urged about the spindle parts 16b due to the urging force of the plate spring 21, and both return regulation vanes 16c come into contact with the peripheral edge portion of the operational opening 11d and are hold in a prescribed posture.

When the respective tongue parts 5c and 6c of both tongue members 5 and 6 are simultaneously successively inserted from the tongue insertion part 19 along the tongue insertion path 19a from this state, the end surfaces 5h and 6h of both tongue parts 5 and 6 come into contact with both side surfaces of the tongue contact part 13d respectively, and the ejector 13 is press-operated against the urging force of the extrusion spring 14 when both tongue parts 5c and 6c are further successively inserted. At this time, the tongue contact part 13d is formed in the sharp triangular shape with respect to the dissociative direction P and the end surfaces 5h and 6h of both tongue parts 5c and 6c are mutually inwardly inclinatorily formed, whereby the ejector 13 is press-operated along the insertion direction Q under guiding by both guide rail parts 15g while maintaining its insertion allowing posture.

Following the movement of the ejector 13 in the insertion direction Q according to this press operation, the side of the engaging member 10 closer to the engaging projections 10c is downwardly operated along the engaging member holding guide 13j under the urging force by the plate spring 21. In the display member 17, the slide part 17d is slid along the display member holding guide 13k and the display member 17 is rotationally operated about the spindle parts 17b against the urging force of the torsion spring 23.

Figure 7:
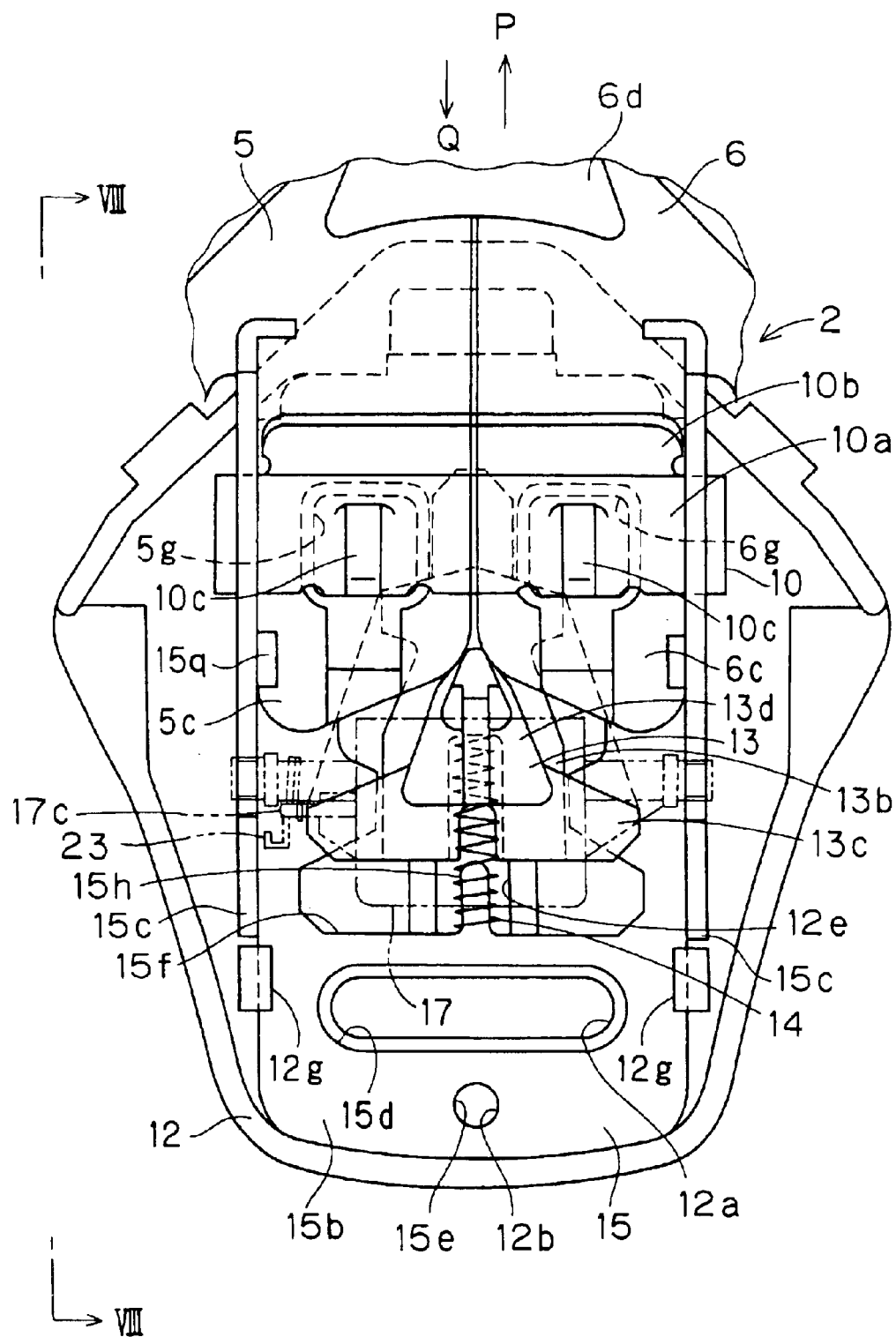
FIG. 7 is an operational explanatory diagram for insertion of the tongue parts in the state detaching the upper cover body.

Thereafter the engaging member 10 separates from the engaging member holding guide 13j when the respective engaging projections 10c come into contact with upper portions of the tongue parts 5c and 6c due to insertion of both tongue parts 5c and 6c, and the locked state where both engaging projections 10c are downwardly operated to enter the respective engaging holes 5g and 6g and engage therewith is obtained under the urging force by the plate spring 21 as shown in FIG. 7 and FIG. 8 when both tongue parts 5c and 6c are inserted and the respective engaging holes 5g and 6g reach prescribed positions.

At this time, the display member 17 is further rotationally operated about the spindle parts 17b due to relative sliding of the display member holding guide 13k and the slide part 17d, so that the locked state display area B is located in correspondence to the position of the display window 11e and the locked state can be also visually confirmed.

In a case of subsequently releasing this locked state, the operational projections 16d come into contact with the disengagement operational fragment part 10b when pushdown-operating the disengagement button 16 against the urging force of the plate spring 21, and the side closer to the engaging projections 10c is upwardly operated when further pushdown-operating the same so that the engaging state of the respective engaging holes 5g and 6g and the respective engaging projections 10c is released.

When this engaging body is released, the ejector 13 is extruded in the dissociative direction P due to the urging force accumulated in the extrusion spring 13, and the respective tongue parts 5c and 6c are extruded in the direction opposite to the insertion direction Q and dissociative-operated due to this movement of the ejector 13 in the dissociative direction P.

At this time, an end of the support fragment part 10a is placed on the engaging member holding guide 13j, and the engaging projections 10c retreat upward beyond the tongue insertion path 19a as shown in FIG. 6. In the display member 17, on the other hand, the display member holding guide 13k and the slide part 17d are relatively slid due to the urging force accumulated in the torsion spring 23, so that the unlocked state display area A of the display part 17a is returned to the position of the display window 11e, as shown in FIG. 6. When releasing the pushdown force against the disengagement button 16 at this point, it returns to the initial state as the insertion standby state for the tongue members 5 and 6 shown in FIG. 6.

Figure 9:
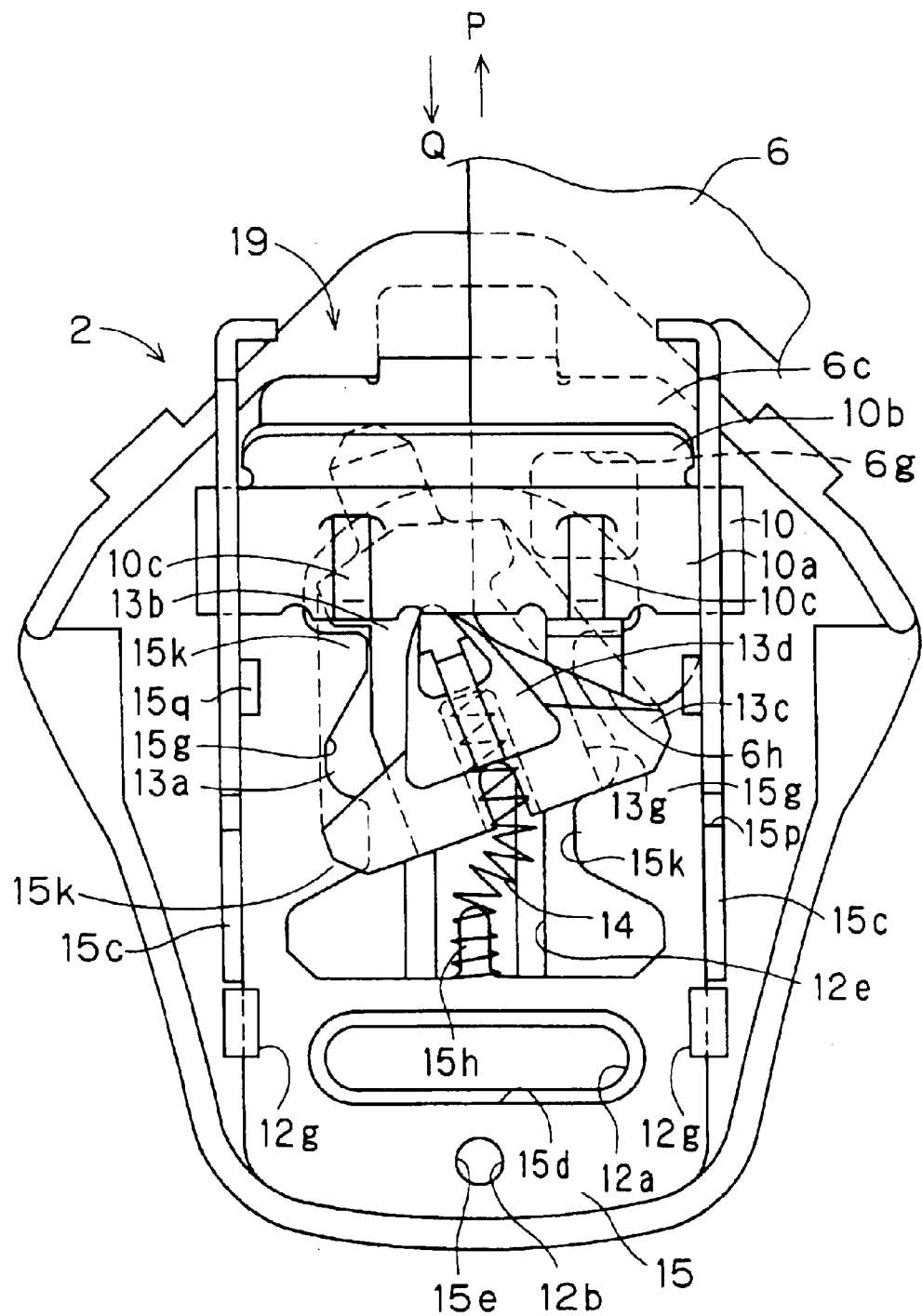
FIG. 9 is an operational explanatory diagram for insertion of only one tongue part in the state detaching the upper cover body.

In a case of inserting only one tongue part 6c from the tongue insertion part 19 as shown in FIG. 9, the end surface 6h which is the insertion end of the tongue part 6c comes into contact with one side surface of the tongue contact part 13d, and when further force-operating the tongue part 6c in this state, the ejector 13 is urged by the extrusion spring 14 and hence the ejector 13 is rotationally operated about the axis of the boss part 13f in the direction where the tongue part 5c is not inserted.

The ejector 13 deviates from the orbit subjected to ordinary press operation due to posture tilting resulting from this rotation of the ejector 13, so that the end surface of the slide guide part 13b opposite to the tongue insertion part 19 in the ejector 13 comes into contact with the stopper parts 15k and the press operation is regulated even if the tongue part 6c is further force-operated from this state. At this time, the ejector 13 further posture-tilts so that the slide guide part 13b on the side closer to the constricted tongue insertion part 19 also comes into contact with the stopper parts 15k, and the press operation in the normal direction is regulated also from this point while subsequent posture tilting is also regulated, so that the tongue part 6c cannot be further inserted.

Therefore, the tongue part 6c cannot be inserted up to the engaging position where the engaging hole 6g corresponds to the engaging projection 6g but unprepared engagement between the engaging hole 6g and the engaging projections 10c can be prevented so that false mounting by only one can be effectively prevented. A person mounting the tongue members 5 and 6 can sensuously fractionate that the insertion stroke for the tongue parts 5c and 6c in engagement and the insertion stroke in non-engagement obviously differ from each other, and can quickly recognize that the tongue members 5 and 6 and the buckle body 2 are in a non-engaging state.

When inserting only the tongue part 5c on the side opposite to the above, the ejector 13 posture-tilts in the direction opposite to the above and similarly operates.

The insertion control means regulating the movement of the tongue parts 5c and 6c in the insertion direction is formed by only the single ejector 13 and the frame member 15 slide-guiding the same, the number of components may not be increased dissimilarly to the prior art, it is excellent in assembling workability with a simple structure, and cost reduction can be attained.

The ejector 13 is posture-tilted from the ordinary insertion allowing posture so that movement of the ejector 13 in the insertion direction Q can be effectively suppressed, and the buckle body 2 may not be largely structured but compactification can be attained as the whole of the buckle apparatus.

Further, the tongue contact part 13d of the ejector 13 is brought into the sharp shape toward the dissociative direction P, whereby the same is readily posture-tilted from the insertion allowing posture when only one tongue part 5c or 6c is inserted so that suppression performance not unpreparedly inserting only one tongue part 5c or 6c up to the engaging position with the engaging member 10 can be effectively improved.

The end surfaces 5h and 6h of the tongue parts 5c and 6c in both tongue members 5 and 6 are mutually inwardly inclinatorily formed, whereby the tongue contact part 13d can be stably held on the central positions of both tongue parts 5c and 6c, the ejector 13 can be stably press-operated along the insertion direction Q in the insertion allowing posture and the engaging holes 5g and 6g in both tongue parts 5c and 6c and the respective engaging projections 10c of the engaging member 10 can be more reliably engaged when simultaneously inserting both tongue parts 5c and 6c.

In the insertion standby state for the tongue members 5 and 6, further, the ejector 13 can be stably held in the insertion allowing posture due to the contact of the slide guide member 13b with respect to the posture holding guide 15j and the contact between the flat surface of the boss part 13f and the flat surface of the ejector guide groove 12e, and the aforementioned control operation in insertion can be more stably exerted when the tongue members 5 and 6 are simultaneously inserted or only one is inserted.

While the aforementioned embodiment shows the structure slidably holding the ejector 13 on the frame member 15 mounted on the lower cover body 12, a structure integrally comprising a structure similar to the frame member 15 on the lower cover body 12 for slidably holding the ejector 13 may be employed.

Also in insertion of the respective tongue parts 5c and 6c with respect to the tongue insertion path 19a, the same may be substantially simultaneously inserted.

What is claimed is:

1. A buckle apparatus, comprising:

an ejector disposed in a buckle body, the ejector configured to be press-operated against an urging force of an extrusion spring due to insertion of tongue members into the buckle body; and an engaging member disposed in the buckle body, the engaging member disengageably engaging with the tongue members when the tongue members are received at an engaging position, the ejector configured to urge the tongue members in a dissociative direction by the extrusion spring when the tongue members are disengaged from the engaging member, wherein the ejector is subjected to a press operation in an insertion allowing posture to allow insertion of the tongue members up to the engaging position when the pair of tongue members are substantially simultaneously subjected to the insertion and to achieve a tilting posture to suppress insertion of the tongue members up to the engaging position when only one of the tongue member is inserted into the buckle body, wherein a frame member comprises a guide rail slidingly guiding the ejector in the insertion allowing posture to reciprocate along a direction of the press operation, and a stopper separably comes into contact with the ejector in the tilting posture from the insertion allowing posture for regulating movement in the direction of the press operation, the stopper provided on the guide rail, and wherein a tongue contact of said ejector coming into contact with said tongue members in said press operation is formed in a sharp shape toward said dissociative direction.

2. The buckle apparatus according to claim 1, wherein insertion side end surfaces of said pair of tongue members coming into contact with said ejector for performing said press operation are mutually inwardly formed with an inclined surface.

3. The buckle apparatus according to claim 2, wherein a posture holding guide separably coming into contact with said ejector urged by said extrusion spring for holding the ejector in said insertion allowing posture in an insertion standby state for said tongue members is provided on said frame member.

4. The buckle apparatus according to claim 1, wherein a posture holding guide separably coming into contact with said ejector urged by said extrusion spring for holding the ejector in said insertion allowing posture in an insertion standby state for said tongue members is provided on said frame member.

5. A buckle apparatus comprising:

an ejector disposed in a buckle body, the ejector configured to be press-operated against an urging force of an extrusion spring due to insertion of tongue members into the buckle body; and an engaging member disposed in the buckle body, the engaging member disengageably engaging with the tongue members when the tongue members are received at an engaging position, the ejector configured to urge the tongue members in a dissociative direction by the extrusion spring when the tongue members are disengaged from the engaging member, wherein the ejector is subjected to a press operation in an insertion allowing posture to allow insertion of the tongue members up to the engaging position when the pair of tongue members are substantially simultaneously subjected to the insertion and to achieve a tilting posture to suppress insertion of the tongue members up to the engaging position when only one of the tongue member is inserted into the buckle body, wherein a frame member comprises a guide rail slidingly guiding the ejector in the insertion allowing posture to reciprocate along a direction of the press operation, and a stopper separably comes into contact with the ejector in the tilting posture from the insertion allowing posture for regulating movement in the direction of the press operation, the stopper provided on the guide rail, and wherein a posture holding guide separably coming into contact with said ejector urged by said extrusion spring for holding the ejector in said insertion allowing posture in an insertion standby state for said tongue members is provided on said frame member.

6. A buckle apparatus comprising:

an ejector disposed in a buckle body, the ejector configured to be press-operated against an urging force of an extrusion spring due to insertion of tongue members into the buckle body; and an engaging member disposed in the buckle body, the engaging member disengageably engaging with the tongue members when the tongue members are received at an engaging position, the ejector configured to urge the tongue members in a dissociative direction by the extrusion spring when the tongue members are disengaged from the engaging member, wherein the ejector is subjected to a press operation in an insertion allowing posture to allow insertion of the tongue members up to the engaging position when the pair of tongue members are substantially simultaneously subjected to the insertion and to achieve a tilting posture to suppress insertion of the tongue members up to the engaging position when only one of the tongue member is inserted into the buckle body, wherein a frame member comprises a guide rail slidingly guiding the ejector in the insertion allowing posture to reciprocate along a direction of the press operation, and a stopper separably comes into contact with the ejector in the tilting posture from the insertion allowing posture for regulating movement in the direction of the press operation, the stopper provided on the guide rail, wherein insertion side end surfaces of the tongue members coming into contact with the ejector for performing the press operation are mutually inwardly formed with an inclined surface, and wherein a posture holding guide separably coming into contact with said ejector urged by said extrusion spring for holding the ejector in said insertion allowing posture in an insertion standby state for said tongue members is provided on said frame member.

* * * * *